US007076432B1

(12) United States Patent
Cheah et al.

(10) Patent No.: US 7,076,432 B1
(45) Date of Patent: Jul. 11, 2006

(54) METHOD AND APPARATUS FOR PROCESSING DIGITALLY ENCODED AUDIO DATA

(75) Inventors: Sin Hui Cheah, Carmel, IN (US); Robert James Dick, Sr., Carmel, IN (US); Tibor G. Csicsatka, San Diego, CA (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 10/030,769

(22) PCT Filed: Apr. 28, 2000

(86) PCT No.: PCT/US00/00629

§ 371 (c)(1),
(2), (4) Date: Oct. 22, 2001

(87) PCT Pub. No.: WO00/67258

PCT Pub. Date: Nov. 9, 2000

Related U.S. Application Data (60) Provisional application No. 60/131,881, filed on Apr. 30, 1999.

(51) Int. Cl.
*G10L 19/20* (2006.01)
(52) U.S. Cl. .................... 704/500; 380/201; 380/200; 713/176
(58) Field of Classification Search ........ 704/500–504; 380/201, 200; 713/176
See application file for complete search history.

(56) References Cited

U.S. PATENT DOCUMENTS 5,670,730 A    9/1997  Grewe et al. ............... 84/609

5,680,504 A    10/1997 Kopp ........................ 395/2.1

(Continued)

FOREIGN PATENT DOCUMENTS

EP       0561685       9/1993

*Primary Examiner*—Susan McFadden
*Assistant Examiner*—Huyen X. Vo
(74) *Attorney, Agent, or Firm*—Joseph S. Tripoli; Robert D. Shedd; Paul P. Kiel (57) ABSTRACT

An apparatus and a method for processing encoded digital audio data, wherein the digital audio data is encoded using one of a plurality of encoding formats. The present invention prevents encoded digital audio data that has been copied onto a particular type of data storage medium having a unique identifier, such as a compactflash memory card, from another one of the particular type of data storage medium from being playable in an audio playback device according to the present invention. In accordance with the present invention, an encoded audio data file is encrypted using a unique identifier associated with the data storage device and a second key, an associated decoder file is encrypted using a first key, and the encrypted data and decoder files are stored onto the data storage device. During playback, a digital signal processor decrypt the audio data file in response to the second key and decrypts the decoder file in response to the first key. Advantageously, the second key is generated in response to the unique identifier and a third key. This method of encrypting and playing back the audio data files stored in the data storage device prevents an apparatus according to the present invention from playing back audio data files from a particular type of data storage device having a unique identifier, when the audio data files have been copied from another one of the same type of data storage device.

10 Claims, 6 Drawing Sheets

U.S. PATENT DOCUMENTS

| | | | |
|---|---|---|---|
| 5,694,516 A | 12/1997 | Grewe et al. | 395/2.1 |
| 5,696,928 A | 12/1997 | Grewe et al. | 395/430 |
| 5,822,284 A | 10/1998 | Nishizawa | 369/32 |
| 5,914,941 A | 6/1999 | Janky | 370/313 |
| 6,118,870 A * | 9/2000 | Boyle et al. | 380/201 |
| 6,301,663 B1 * | 10/2001 | Kato et al. | 713/176 |

* cited by examiner

METHOD AND APPARATUS FOR PROCESSING DIGITALLY ENCODED AUDIO DATA

This application claims the benefit of U.S. provisional application Ser. No. 60/131,881 filed Apr. 30, 1999, which is hereby incorporated herein by reference, and which claims the benefit under 35 U.S.C. § 365 of International Application PCT/US00/11629, filed Apr. 28, 2000, which was published in accordance with PCT Article 21(2) on Nov. 9, 2000 in English.

The present invention relates to an apparatus and a method for processing digitally encoded data, and in particular, to a portable apparatus and a method for processing digitally encoded audio data that has been encoded using a selected one of a plurality of encoding/decoding formats. The present invention is particularly advantageous in handheld applications.

The use of portable audio devices capable of playing digitally encoded data is becoming commonplace. In particular, relatively small handheld o devices that can process digitally encoded audio data stored on solid state memory devices are becoming popular. Such portable audio devices include those adapted to play digital data that has been encoded, or compressed, and stored on memory chips included within the audio player or on relatively small removable storage media, such as a compactflash™ memory card. The solid s state memory based devices are particularly advantageous for use while exercising, or other physical activity, because such devices are not susceptible to skips and other similar problems associated with moving data storage media, such as CDs.

In a solid state memory based device, the digital audio data is loaded onto the memory device by, for example, downloading the data from the internet or from another digital audio player. The data is usually compressed and loaded onto the memory device through a personal computer having appropriate software loaded thereon. The memory device may also include preloaded audio data.

The data is compressed prior to loading onto the memory device and decompressed during playback according to a selected encoding format. A variety of encoding formats for compressing and decompressing audio data is available. As used hereinafter, the term encoding format refers to any encoding/decoding scheme that specifies the syntax and semantics of a compressed bitstream and how the bitstream must be decompressed for reproduction. Such encoding formats include, but are not limited to, MP3 and Real Networks G2. Additionally, new encoding formats are being developed and expected to be available in the future.

Unauthorized copying and distribution of digitally encoded data is a significant concern associated with such players, especially in light of the growing popularity of such devices and the relative ease with which such data is downloaded and distributed over the Internet and other sources. Therefore, it is desirable to provide a portable audio data processing apparatus and a method for processing encoded audio data prevents a user from playing data that has been copied without authorization. Also, it is desirable to prevent a user from making multiple playable copies of an audio data files from one removable data storage device, such as a compactflash™ memory card, to a similar type of data storage device.

The present invention addresses the above-noted objectives with regard to portable audio players, particularly handheld audio players, by providing a portable audio playback apparatus and a method for processing encoded audio fib data file that prevents the copying of an audio data file in playable form from one removable data storage device, which device includes a unique identifier stored therein, to another similar type of data storage device. In particular, the present invention provides a portable audio player and a method for processing audio data files that encrypts the audio data files in response to a unique identifier associated with a removable data storage device and a key stored in a key file of the portable audio player.

In one respect, the present invention is, in a portable audio data processing apparatus comprising a micro-controller coupled to a digital signal processor, the apparatus having a key file and a decryption program stored therein, the apparatus adapted to be removably coupled to a data storage device having a unique identifier, an audio data file and a decoder file stored therein, a method for processing the audio data file, the method comprising the steps of: identifying first and second keys in response to the decryption program; retrieving the audio data file and the decoder file from the data storage device in response to a user selection of the audio data file; decrypting the decoder file in response to the first key and the decryption program; decrypting the audio data file in response to the second key and the decryption program; decoding the decrypted audio data file in response to the decrypted decoder file; and providing the decrypted, decoded audio data file to an output device. Advantageously, the second key is identified in response to a unique identifier associated with the data storage device, a third key and the decryption program, wherein the third key is identified in response to the decryption program.

In another respect, the present invention is a portable audio data processing apparatus, comprising: user input means for receiving user inputs; data input means for receiving digital data; a data storage device having an audio data file, a decoder file and a unique identifier stored therein, the data storage device adapted to be coupled to the data input means; a digital signal processor; and a micro-controller coupled to the user input means, data input means, and digital signal processor, the micro-controller transferring a decryption program and a key file to the digital signal processor in response to the data storage device being coupled to the data input means, the digital signal processor identifying first and second keys in response to the decryption program, the micro-controller transferring the audio data file, the decoder file and the unique identifier from the data storage device to the digital signal processor in response to user selection of the audio data file, the digital signal processor decrypting the decoder file in response to the first key and the decryption program, the digital signal processor decrypting the audio data file in response to the second key and the decryption program, the digital signal processor decoding the decrypted audio data file in response to the decoder file. Advantageously, the digital signal processor identifies the second key in response to the unique identifier, a third key and the decryption program, wherein the third key is identified in response to the decryption program.

The present invention is described in more detail with reference to the figures, wherein.

Figure 1:
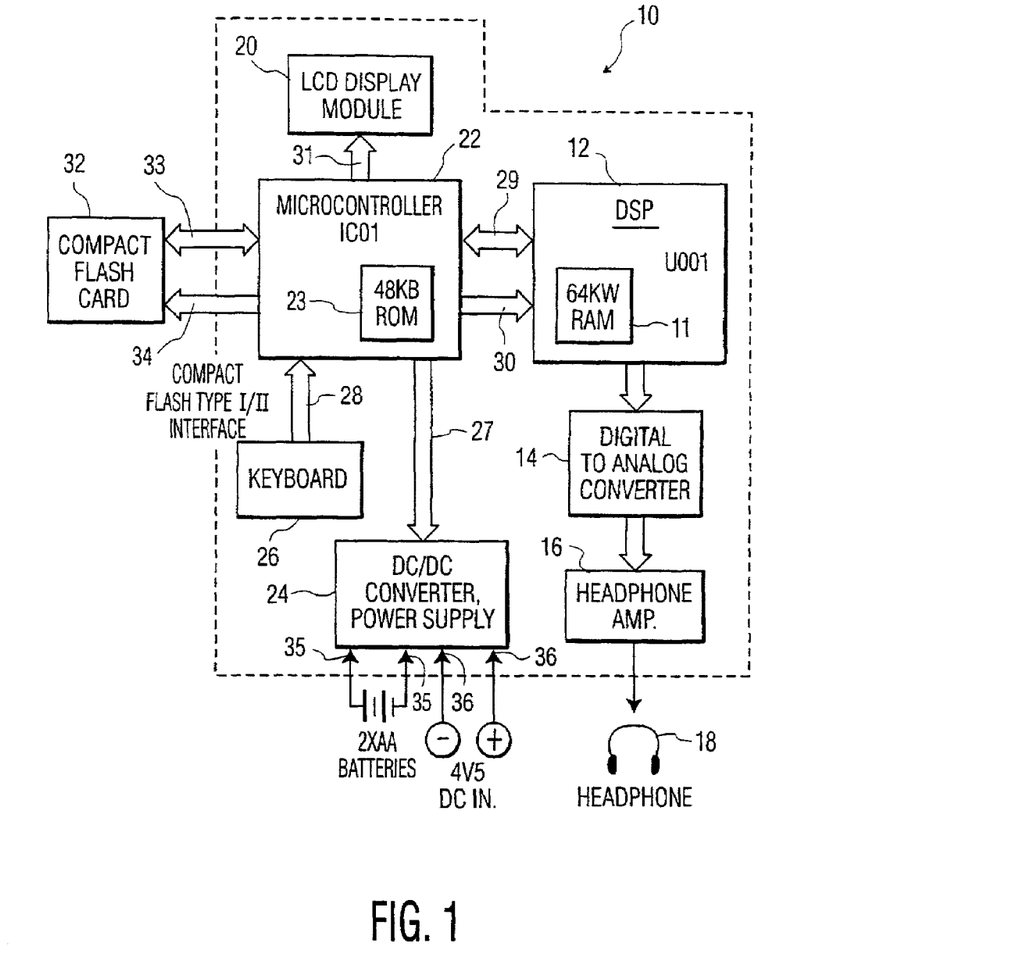
FIG. 1 is a block diagram of a portable audio device according to the present invention.

FIG. 1 shows a block diagram of portable audio device 10 according to the present invention. The arrangement and operation of the various elements are described hereinbelow. However, the details of the various elements of audio device 10 are well known to those skilled in the art and will not be discussed here. Audio device 10 comprises micro-controller 22 that controls the various elements and the overall operation of audio device 10, including the transferring data from memory card 32 to DSP 12. Micro-controller 22 includes a suitable amount of memory 23, in this case 48 KB of ROM, which includes various instruction sets, decryption programs, key files and a security code for controlling the operation of audio player 10 stored thereon. Suitable micro-controllers include, but are not limited to, µPC78A4036 manufactured by NEC Corporation.

Audio device 10 also includes digital signal processor ("DSP") 12 that may be programmed to perform a variety of signal processing functions during playback of a selected audio data file. In this case, the functions that DSP 12 performs during playback includes, but is not limited to, decrypting a decryption program using a security code, decrypting a decoder file with the decryption program using a first key, decrypting an audio data file with the decryption program using a second key and a unique identifier associated with memory card 32, and decoding the audio data file using the decoder file. Other functions include volume control, digital sound equalizer, and sample conversion. In that regard, DSP 12 includes on-board memory 11, in this case 64 KW of RAM, wherein the decryption program, key files, security code, decoder files and audio data files, and various other required data are loaded during playback.

The decoder files comprise programs that control the decoding operations of DSP 12 and the audio data files include data associated with the audio content. Both the audio data files and the decoder files are stored in memory card 32 in encrypted form. The decoder file is transferred to DSP RAM 11 from memory card 32 and decrypted as described further below. Suitable DSP units, include, but are not limited to, TMS320NC5410 manufactured by Texas Instruments, Inc. of Dallas, Tex.

As a selected audio data file is decoded, DSP 12 provides the decoded data stream to digital to analog converter 14. D/A converter 14 converts the digital output of DSP 12 into an analog signal and provides the analog signal to headphone amplifier 16. The analog signals are amplified by headphone amplifier 16 and provided to headphone 18 via output jacks disposed on the housing of audio player 10.

In the preferred embodiment, audio player 10 is adapted to operate with memory card 32. Memory card 32 is a solid state data storage device that can be used to store various data files, including encoded audio data files and decoder files for controlling the decoding operation of DSP 12. Memory card 32 may be removably coupled to audio player 10 via memory card port 38 and a large amount of data can be readily transferred from memory card 32 to audio player 10 through data bus 33. The solid state nature of memory card 32 allows large amount of data to be transferred to audio player 10 without skips and other similar disadvantages associated with media, such as CDs, that require precise moving parts. Suitable memory cards include, but are not limited to, CompactFlash™ type 1 and 11 of the CompactFlash Association (CFA) standard (IDE Mode). Also, hard drive type media, such as Microdrive™ manufactured by IBM Corporation of Armonk, N.Y., may be used.

Using the present invention, several decoder files and relatively large amounts of audio data can be stored on currently available flash memory cards. For example, a 64 MB compactflash™ card provides approximately 68 minutes of audio at MP3 bit-rate of 128 Kbps, wherein approximately 60–70 KB are required for the decoder programs and approximately 1 MB is required for each minute of music output.

Audio data files and associated decoder files are loaded onto memory card 32 using a PC, or other similar device, having music management software loaded thereon. The music management software is designed to load the desired audio data files along with the associated decoder files onto memory card 32. The music management software is implemented using programming methods known in the art. Alternatively, the required data may be downloaded through another source, for example, through the Internet or another player, wherein the downloaded data includes the desired audio data files and their associated decoder files.

Keyboard 26 comprises a plurality of keys disposed on the housing of audio player 10 for allowing a user to select a particular audio data file for playback and to control playback settings. LCD display module 20 is coupled to to micro-controller 22 and provides a listing of the selections available on memory card 32 and also status information regarding audio player 10.

Figure 2A:
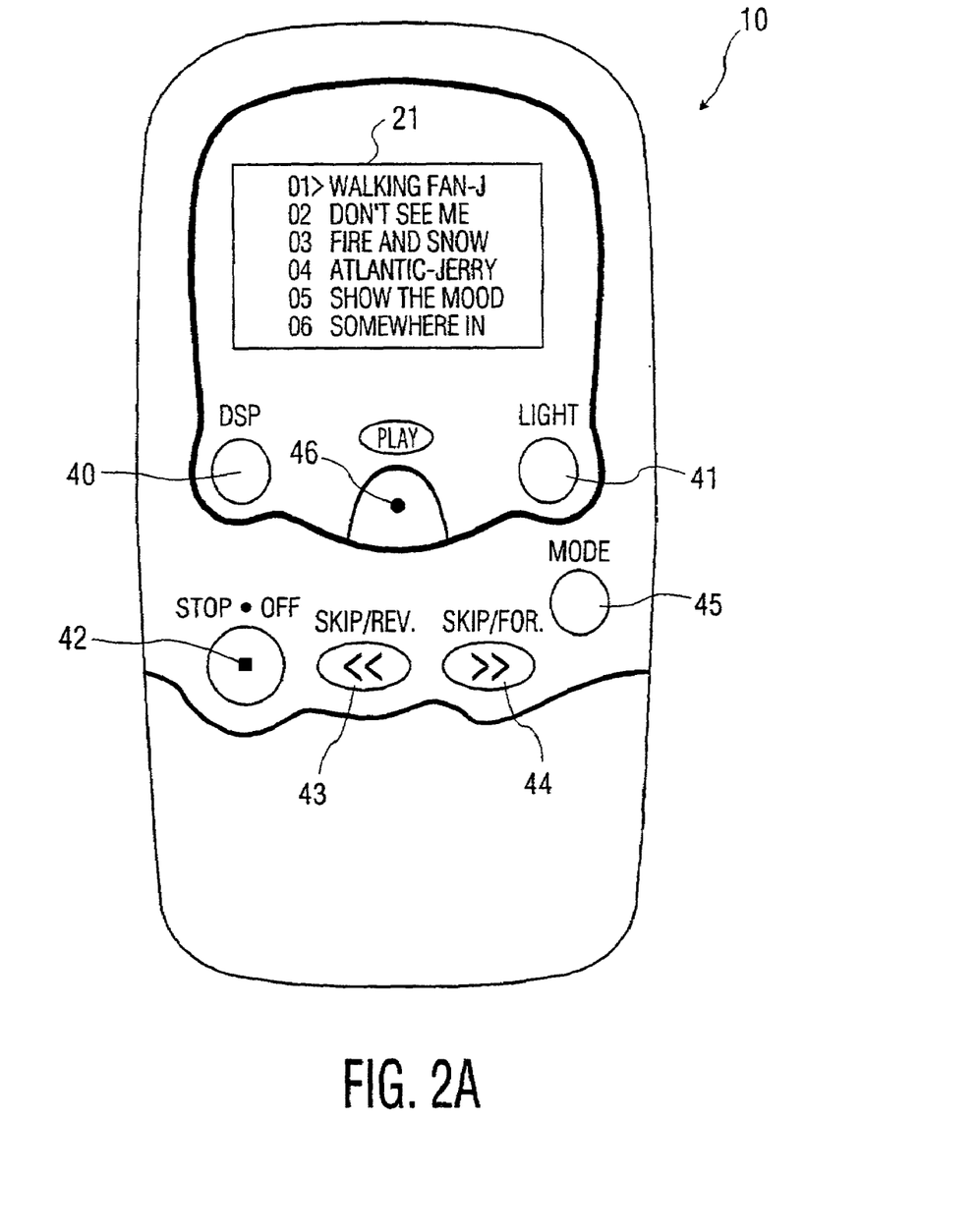
FIGS. 2A–B illustrate a handheld audio apparatus according to the present invention.
Figure 2B:
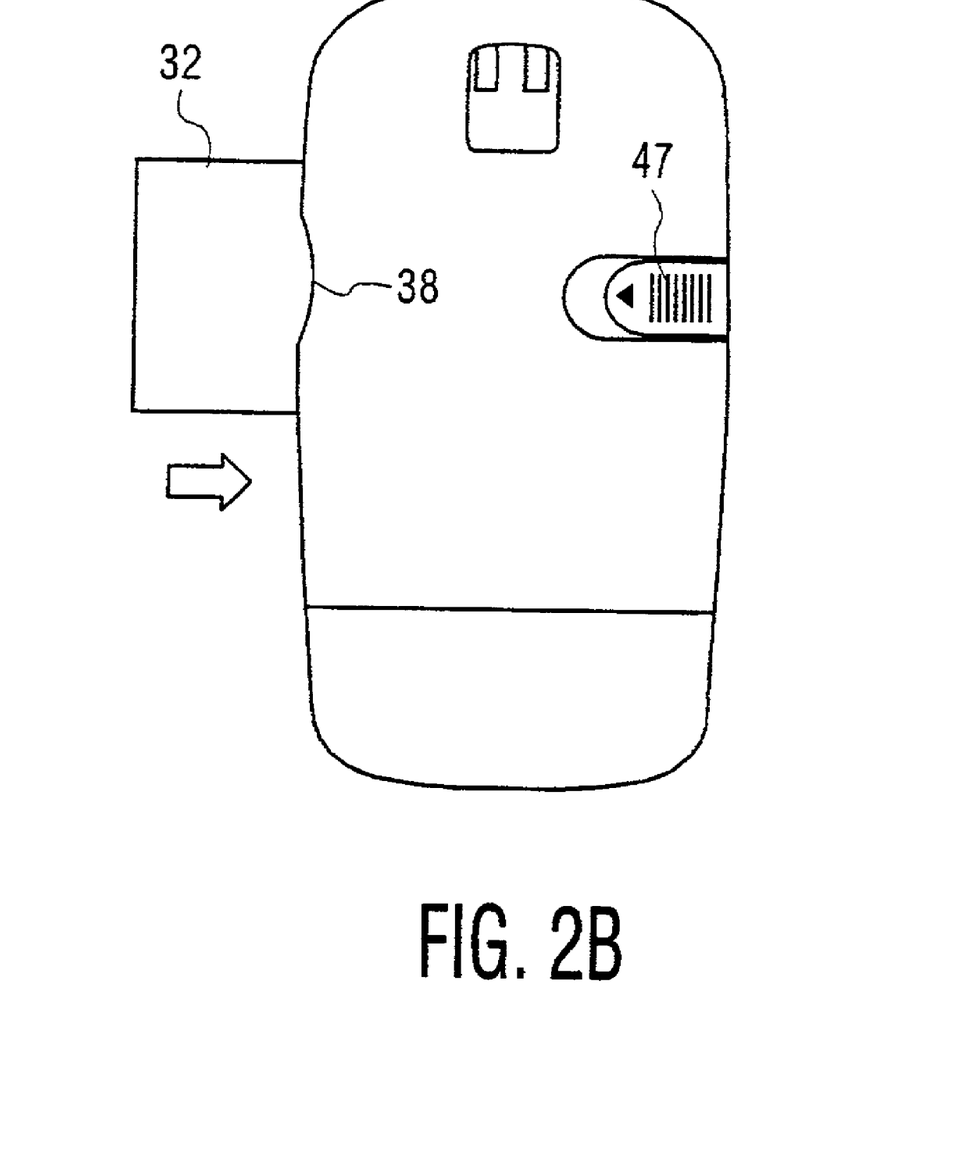

FIGS. 2A–B illustrate the displays and buttons disposed on the housing of audio player 10. As shown in FIG. 2A, audio player 10 includes display 21 that displays the audio data files stored on memory card 32 and various status information associated with audio player 10. PLAY button 46 allows a user to begin play of a selected data file. STOP/OFF button 42 allows a user to stop play and turn audio player 10 OFF. SKIP/FOR. button 44 and SKIP/REV. button 43 allow a user to scroll between different audio data files displayed on display 21. Mode button 45 allows a user to a particular playback mode, including NORMAL, REPEAT PLAYBACK and SHUFFLE. DSP button 40 allows a user to select one of a plurality of DSP modes, including FLAT, BASS, BOOST, ROCK, POP, JAZZ, and EQ. FIG. 2B shows memory card port 38 having memory card 32 inserted therein, and ejector lever 47 for ejecting memory card 32 from memory card port 38.

After insertion of memory card 32 into memory card port 38 of audio player 10 and prior to beginning playback, micro-controller 22 reads memory card 32, in particular a configuration file stored therein, to identify and display the audio data files stored on memory card 32, and their associated encoding formats. When the user selects a particular audio data file for playback, micro-controller 22 loads the selected audio data file and the appropriate decoder file into DSP RAM 11, wherein DSP 12 decrypts both the data and decoder files, and then decodes the selected audio data file using the decoder file. Thus, the decoder files on memory card 32 allow audio player 10 to be adapted to process the various encoding formats associated with the audio data files stored on memory card 32. In effect, portable audio player 10 is software upgraded, as necessary, by the decoder files stored on memory card 32 when the user selects a particular audio data file stored on memory card 32. The steps associated with processing a selected audio data file from memory card 32 using audio player 10 is shown in the flowcharts of FIGS. 3 and 4, and described below.

Figure 3:
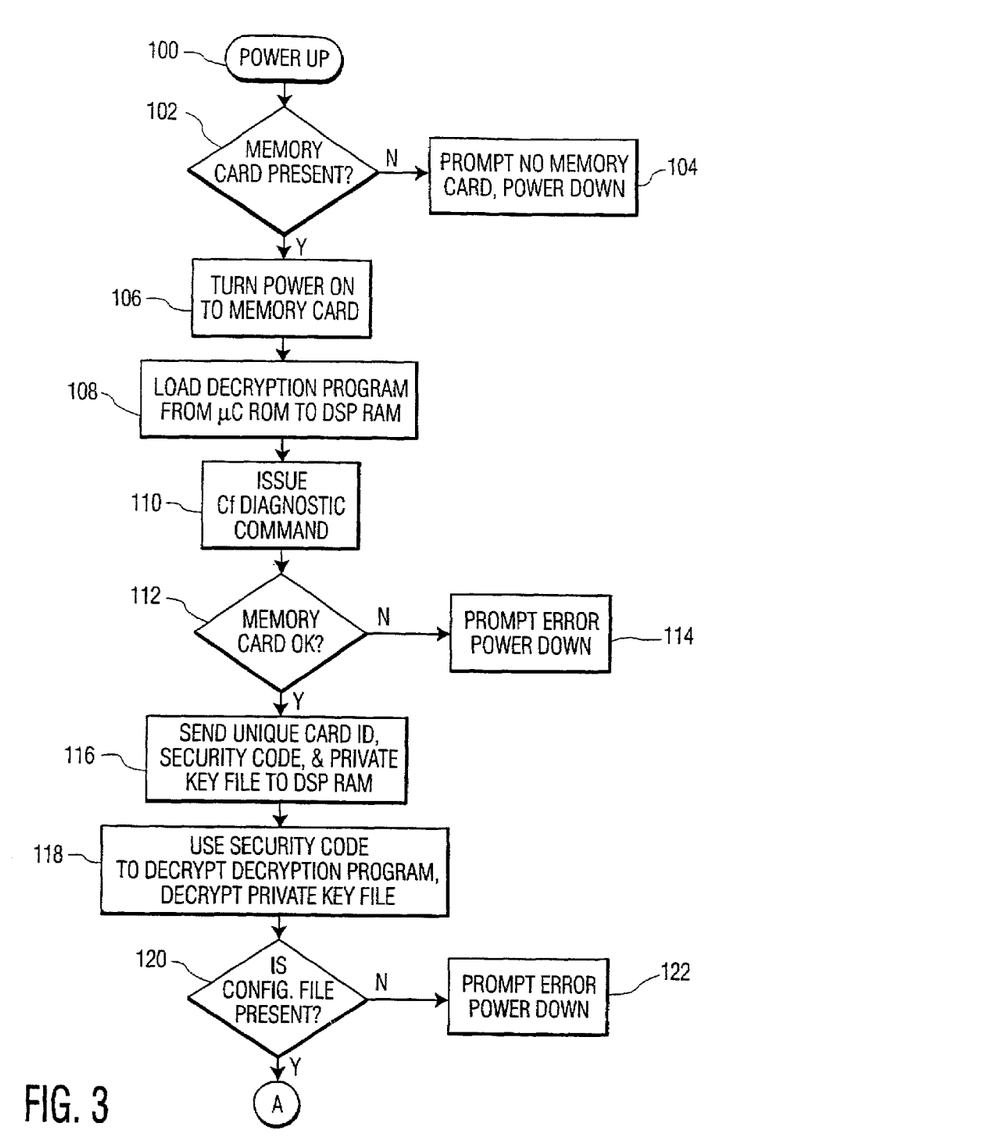
FIGS. 3–4 are flowcharts illustrating the steps for playing back an audio track using a portable audio device according to the present invention.
Figure 4:
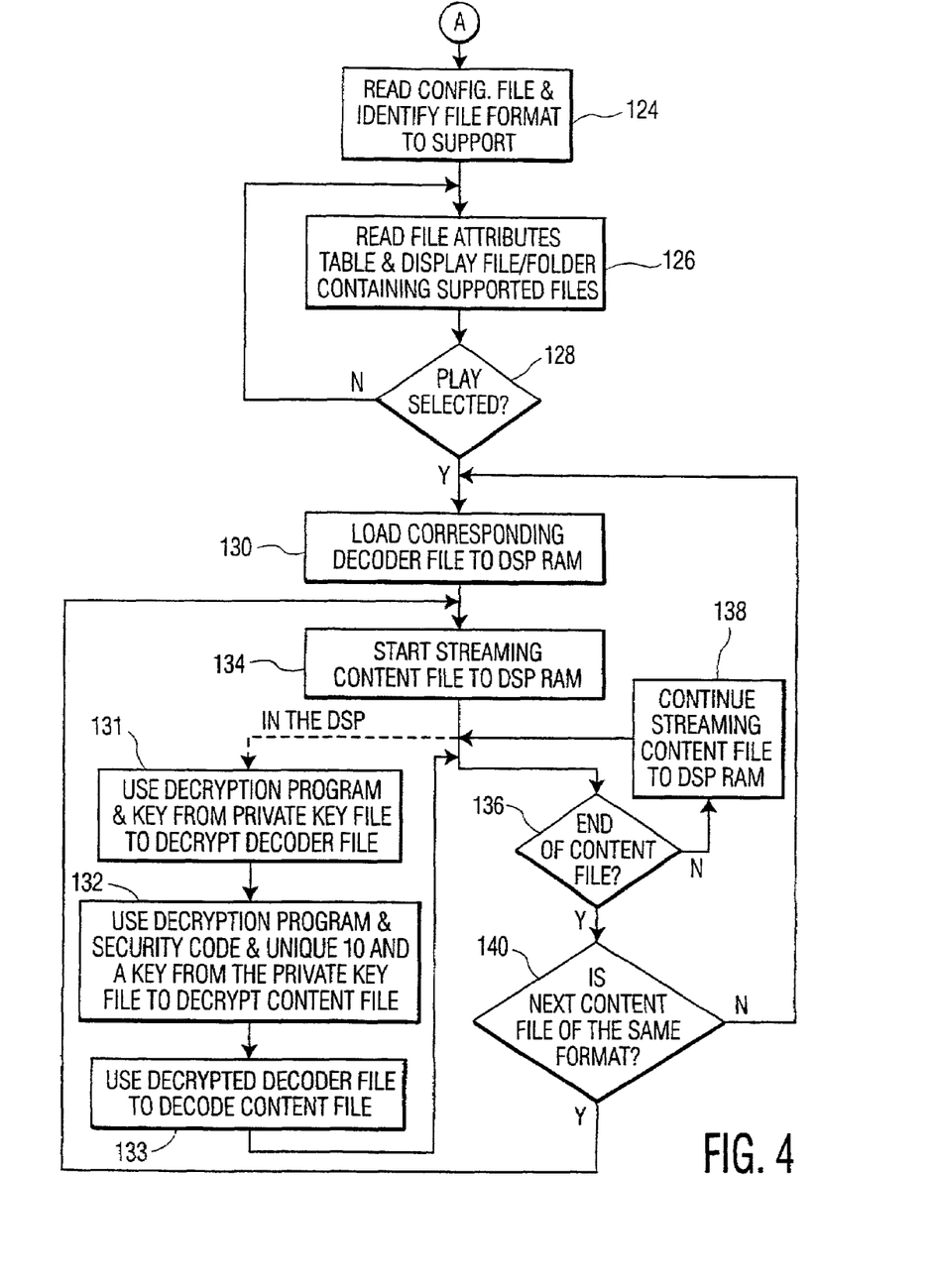
Figure 5:
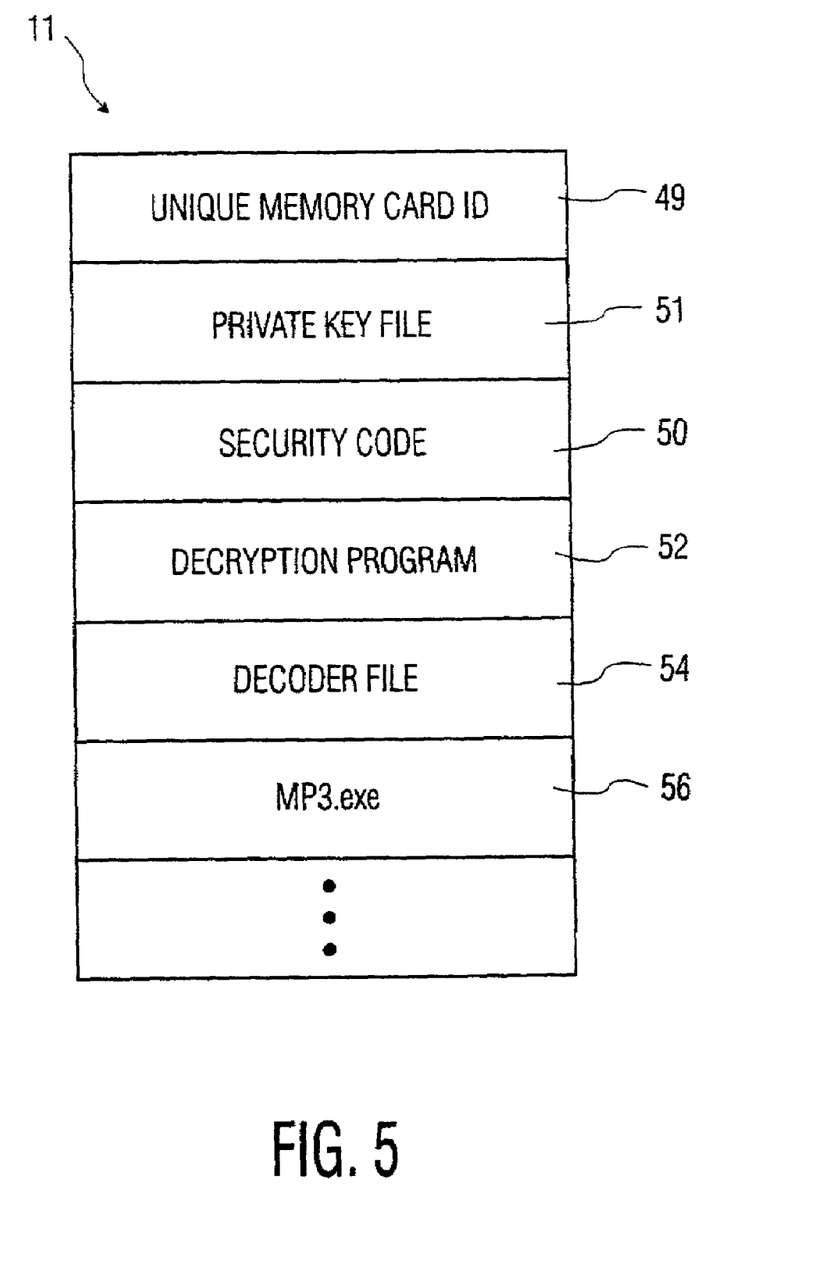
FIG. 5 is a memory map diagram illustrating the various data blocks that are loaded into and processed within the DSP.

FIGS. 3 and 4 show flowcharts illustrating the steps for processing a selected audio data file in accordance with the present invention. After powering UP in step 100, micro-controller 22 of audio player 10 checks for the presence of memory card 32 in flash card port 38 in step 102. If memory card 32 is not detected in flash card port 38, audio player 10 powers DOWN in step 104. If memory card 32 is detected, audio player 10 turns ON the power to memory card 32 in step 106.

In step 108, micro-controller 22 transfers the decryption program stored in micro-controller ROM 23 to DSP RAM 11. In step 110, micro-controller 22 issues a diagnostic check command to cause memory card 32 to perform a set of self-diagnostic checks. If memory card 32 is determined to be in a faulty condition in step 112, micro-controller 22 indicates that an error condition exists and powers DOWN memory card 32 in step 114.

If memory card 32 is determined to be in an acceptable condition, micro-controller 22 reads the unique ID number embedded in memory card 32. In step 116, micro-controller 22 transfers the unique ID number of memory card 32, and a private key file and a security code stored in micro-controller ROM 23 to DSP RAM 11. Following this transfer, in step 118, DSP 12 decrypts the decryption program using the security code. The decryption program specifies certain keys using a pointer that specifies the memory location of DSP RAM 11 wherein the desired keys are stored, from the key file to be used during subsequent decryption operations as noted below.

In step 120, micro-controller 22 determines whether a configuration file is present in memory card 32. In step 122, if a configuration file is not found, micro-controller 22 causes an error indication to be displayed on display 21 and powers DOWN memory card 32. In step 124, if a configuration file is present, micro-controller 22 reads the configuration file and identifies the various file formats that need to be supported for the data files stored on memory card 32. The configuration file also includes information that equates the file extension of the audio data files with particular decoder files stored in memory card 32. In step 126, micro-controller 22 reads the file attribute table stored on memory card 32 and causes display 21 to display the file/folders stored in memory card 32. At this point, the user may select a desired one of the displayed audio data files, or music tracks, for playback.

When an audio data file is selected for playback in step 128, micro-controller 22 and DSP 11 perform a number of steps, including several concurrent steps to provide audio playback. First, micro-controller 22 identifies and transfers the corresponding decoder file from memory card 32 to DSP RAM 11 in step 130. For example, if the user selects an MP3 file, micro-controller 22 transfers the MP3 decoder file from memory card 32 to DSP RAM 11. At this point, the MP3 decoder file is encrypted and must be decrypted before it can be used to control the decoding operation of DSP 12. In step 131, DSP 12 decrypts the decoder file loaded in DSP RAM 11 using the decryption program that was decrypted in step 118 and a first key in the key file specified by the decryption program.

In step 134, micro-controller 22 begins streaming the selected audio data file from memory card 32 to DSP 12. In step 132, DSP 12 uses the decryption program to decrypt the streaming audio data file. An additional security layer with regard to the decryption of the audio data file is provided as follows. A second key from the private key file that is specified by the decryption program and the unique ID number of memory card 32 are used to generate a final key, wherein the final key is used by the decryption program to decrypt the audio data file.

The music management software is designed to use the unique ID number of memory card 32 to encrypt the audio data file when the audio data file is stored in memory card 32. As such, the use of the unique ID number of memory card 32 to generate the final key prevents audio player 10 from playing an audio data file that was copied from another memory card. In step 133, DSP 12 uses the decrypted decoder file to decode the decrypted audio data file in accordance with the appropriate encoding format. The decoded audio data is provided to D/A converter 14 and headphone amp 16 for reproduction.

In step 136, it is determined whether all of the data in the selected audio data file has been transferred to DSP RAM 11. If not, micro-controller 22 continues to stream data from memory card 32 to DSP RAM 11. If the transfer of data is complete as determined in step 136, micro-controller 22 determines in 100 step 140 whether the next audio data file is encoded using the same format as the previous audio data file. If the encoding format of the next audio data file is the same as the previous encoding format, micro-controller 22 returns to step 134 and starts streaming the data from the next audio data file, which data is subsequently decrypted and decoded in steps 132 and 133 as before.

If the encoding format of the next audio data file differs from the encoding format of the previous audio data file, micro-controller 22 returns to step 130. In this case, a new decoder file associated with the next audio data file is transferred to DSP RAM 11, and the steps of decrypting the decoder file, streaming the audio data file, decrypting the data file, and decoding the data file using the newly loaded decoder file is repeated. In this manner, audio player 10 is able to playback audio data files encoded using any one of a plurality of encoding formats, as long as the decoder file associated with the selected encoding format is available and can be downloaded onto DSP RAM 11. In the present embodiment, the necessary decoder files are stored in memory card 32 along with the audio data files. As such, audio player 10 can be updated to play different encoding formats by software updating of the DSP via decoder files stored along with the audio data files in memory card 32. Thus, audio player 10 is capable of playing back data files encoded using a variety of encoding formats, including encoding formats that become available in the future.

In the present invention, audio data files are loaded onto memory card 32 using music management software that encodes the audio data files in accordance with a selected encoding format, such as MP3, encrypts the encoded data files, and then stores the encrypted, encoded data files. Various encryption and decryption methods known to those skilled in the art for generating an encrypted file using a selected key, and then decrypting the encrypted file using the selected key may be used. In the present invention, the decoder files are encrypted using a first key, and the audio data files are encrypted using another key that is generated using the unique identifier on memory card 32. The music management software stores the encrypted audio data files and appropriate encrypted decoder files onto memory card 32. The music management software also generates, and modifies as necessary, a configuration file and a file attribute table to provide information regarding the various data files and decoder files stored on memory card 32. Using the configuration file and the file attributes table, audio player 10 is able to determine the correct encoding format for each content file, display the available file on display 21 and download appropriate decoder file for each content file in response to a user selection.

FIG. 4 is a memory map associated with DSP RAM 11 illustrating the various data files that are transferred to DSP RAM 11 and interactions therebetween. Initially, the unique ID number associated with memory card 32 is stored in memory portion 49. The security code and private key files that are stored in micro-controller ROM 23 are transferred to DSP RAM 11 and stored in respective memory portions 50 and 51. Also, the decryption program is read into memory portion 52 from micro-controller ROM 23. The decoder file associated with a selected audio data file is stored in memory portion 54, and the audio data files are stored in memory portion 56. It is to be understood that the transfer of the various data blocks and the actual arrangement of the data blocks in DSP RAM may be programmed as desired using any one of programming techniques known to those skilled in the art.

As described above, the security code in block 50 is used to decrypt the decryption program in block 52. The decryption program is used to decrypt the decoder file in block 54 and the audio data file in block 56. The decryption program includes a pointer that is used to specify a first key to be used during decryption of the decoder file. Also, a second key specified by the decryption program and the unique ID number of memory card 32 in block 49 are used to generate a final key, and the final key is used by the decryption program to decrypt the selected audio data file. The decoder file is then used to decode the decrypted audio data file. It can be seen that different keys may be selected in the private key file by changing the pointers to the memory locations where the private key file is stored or by changing the locations where the private key file is stored.

It will be apparent to those skilled in the art that although the present invention has been described in terms of an exemplary embodiment, modifications and changes may be made to the disclosed embodiment without departing from the essence of the invention. For example, although the present invention has been described with reference to a memory card that is adapted to be removably coupled to audio player 10, the present invention may be implemented using a memory chip that is fixedly disposed within audio player 10, wherein the decoder program and audio data files are loaded onto the fixed memory chip by the music management software. Also, it is herein recognized that the present feature of loading the appropriate decoder programs and the audio data files may be implemented in the music management software using any one of a number of conventionally known programming methods, or combination of programming methods. Also, although the above is described in reference to an audio data player, the present invention may be extended to any portable data processing device, for example, video display devices, wherein the data may be encoded using one of a plurality of data encoding formats. Also, the audio data files and decoder files may be stored and read from magnetic or optical media. Therefore, it is to be understood that the present invention is intended to cover all modifications as defined in the appended claims.

What is claimed is:

1. In a portable audio data processing apparatus comprising a micro-controller coupled to a digital signal processor, the apparatus having a key file and a decryption program stored therein, the apparatus adapted to be removably coupled to a data storage device having a unique identifier, an audio data file and a decoder file stored therein, a method for processing the audio data file, the method comprising the steps of:

identifying first and second keys stored in a memory of the micro-controller in response to the decryption program;

retrieving the audio data file and the decoder file from the data storage device in response to a user selection of the audio data file;

decrypting the decoder file using the first key and the decryption program;

generating a third key using to the second key and the unique identifier;

decrypting the audio data file using the third key and the decryption program;

decoding the decrypted audio data file using the decrypted decoder file; and providing the decrypted, decoded audio data file to an output device.

2. The method of claim 1, wherein the steps of identifying the first key and identifying the second key comprise identifying a first memory location having the first key stored therein and identifying a second memory location having the second key stored therein.

3. The method of claim 2, wherein the data storage device is a solid state memory device.

4. The method of claim 3, wherein the data storage device is a flash memory card.

5. The method of claim 1, wherein the data storage device includes a plurality of audio data files and decoder files stored therein, each one of the plurality of audio data files being associated with a selected one of the decoder files, the retrieving step comprising identifying a selected decoder file associated with the audio data files and retrieving the audio data file and the selected decoder file in response to the user selection.

6. A portable audio data processing apparatus, comprising:

user input means for receiving user inputs;

data input means for receiving digital data;

a data storage device having an audio data file, a decoder file and a unique identifier stored therein, the data storage device adapted to be removably coupled to the data input means;

a digital signal processor; and a micro-controller coupled to the user input means, data input means, and digital signal processor, the micro-controller transferring a decryption program and a key file to the digital signal processor in response to the data storage device being coupled to the data input means, the digital signal processor identifying first and second keys stored in a memory of the micro-controller in response to the decryption program, the micro-controller transferring the audio data file, the decoder file and the unique identifier from the data storage device to the digital signal processor in response to user selection of the audio data file, the digital signal processor decrypting the decoder file using the first key and the decryption program, the digital signal processor decrypting the audio data file using the second key, the unique identifier and the decryption program, the digital signal processor decoding the decrypted audio data file using the decoder file.

7. The apparatus according to claim 6, wherein the digital signal processor identifies the first and second keys by identifying first and second locations having the first and second keys stored therein.

8. The apparatus according to claim 6, wherein the data storage device comprises a solid state memory device.

9. The apparatus according to claim 6, wherein the data storage device comprises a flash memory card.

10. The apparatus according to claim 6, wherein the data storage device includes a plurality of audio data files and decoder files stored therein, each one of the plurality of audio data files being associated with a selected one of the decoder files, the micro-controller transferring a selected one of the plurality of audio data files and an associated decoder file to the digital signal processor in response to a user selection.

* * * * *